United States Patent
Yamada et al.

(10) Patent No.: US 6,944,539 B2
(45) Date of Patent: Sep. 13, 2005

(54) INFORMATION DISPLAY SYSTEM FOR USE WITH A NAVIGATION SYSTEM

(75) Inventors: Kunihiro Yamada, Okazaki (JP); Yumii Shibata, Okazaki (JP); Hiroyoshi Masuda, Okazaki (JP); Kiyonobu Yamazaki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/451,682

(22) PCT Filed: Oct. 25, 2002

(86) PCT No.: PCT/JP02/11076
§ 371 (c)(1),
(2), (4) Date: Aug. 12, 2003

(87) PCT Pub. No.: WO03/036232
PCT Pub. Date: May 1, 2003

(65) Prior Publication Data
US 2004/0054468 A1 Mar. 18, 2004

(30) Foreign Application Priority Data
Oct. 25, 2001 (JP) .......................................... 2001-327421
Oct. 25, 2001 (JP) .......................................... 2001-328353

(51) Int. Cl.⁷ .......................... G01C 21/00; G06F 17/00
(52) U.S. Cl. ..................... 701/211; 701/200; 701/209; 701/213; 340/995.1; 340/995.13; 340/995.24; 340/996
(58) Field of Search .................. 340/995.1, 995.13, 340/995.24, 996; 701/200, 209, 211, 213

(56) References Cited

U.S. PATENT DOCUMENTS

| | | | |
|---|---|---|---|
| 5,243,529 A | * | 9/1993 | Kashiwazaki ............... 701/208 |
| 5,365,449 A | * | 11/1994 | Kashiwazaki ............... 701/208 |
| 5,654,908 A | * | 8/1997 | Yokoyama .................. 708/109 |
| 5,790,974 A | * | 8/1998 | Tognazzini ............... 455/456.5 |
| 5,938,721 A | * | 8/1999 | Dussell et al. .............. 701/211 |
| 5,946,687 A | * | 8/1999 | Gehani et al. ................ 707/10 |
| 6,208,996 B1 | * | 3/2001 | Ben-Shachar et al. ... 707/104.1 |
| 6,263,209 B1 | * | 7/2001 | Reed et al. .............. 455/456.3 |
| 6,275,231 B1 | | 8/2001 | Obradovich |
| 6,336,072 B1 | | 1/2002 | Takayama et al. |
| 6,339,746 B1 | | 1/2002 | Sugiyama et al. |
| 6,381,534 B2 | * | 4/2002 | Takayama et al. .......... 701/201 |
| 6,678,613 B2 | * | 1/2004 | Andrews et al. ............ 701/213 |
| 2001/0044693 A1 | | 11/2001 | Gotou et al. |

FOREIGN PATENT DOCUMENTS

| | | |
|---|---|---|
| EP | 1 087 316 A2 | 3/2001 |
| JP | 62-166554 U | 10/1987 |
| JP | 5-151168 | 6/1993 |
| JP | A 11-94583 | 4/1999 |
| JP | A 11-282864 | 10/1999 |
| JP | 2001-92878 | 4/2001 |
| JP | A 2001-108457 | 4/2001 |
| JP | A 2001-109764 | 4/2001 |

* cited by examiner

Primary Examiner—Thomas G. Black
Assistant Examiner—Eric M. Gibson
(74) Attorney, Agent, or Firm—Oliff & Berridge, PLC

(57) ABSTRACT

An information display system including an input device that inputs a scheduled event, a schedule storage in which the schedule is stored, a display device that displays a map, a memory that stores map information and the scheduled event, and a controller that displays a schedule reminder message on the map at a specified time before the scheduled event is to occur.

16 Claims, 9 Drawing Sheets

| SCHEDULE | REMINDER TIMING | WITHIN PERIOD OF THIS SCHEDULE |
|---|---|---|
| DATE AND TIME | 2001/09/24 9:00 ~ 2001/09/28 16:00 | |
| LOCATION | POST OFFICE | |
| MEMO | ○○ SEND A PARCEL | |
| ADDRESS | ○○ TOWN ○○ CITY ○○ PREFECTURE | |
| TEL | | INPUT DATE |
| SENDER | ○○○ | SEND DATE 2001/09/14 |

Fig. 4

| SCHEDULE | REMINDER TIMING | DAY BEFORE THIS SCHEDULE |
|---|---|---|
| DATE AND TIME | 2001/09/24  9:00 | |
| LOCATION | ○○ COMPANY AT ×× ROOM | |
| MEMO | MEETING | |
| ADDRESS | ○○ TOWN○○ CITY○○ PREFECTURE | |
| TEL | INPUT DATE | 2001/09/14 |
| SENDER | ○ ○ ○ | SEND DATE |

Fig. 8

| TIME | CONDITIONS (TIME SLOT) |
|---|---|
| EARLY MORNING | 00:00 ≦ T < 06:00 |
| MORNING | 06:00 ≦ T < 12:00 |
| DAYTIME | 12:00 ≦ T < 18:00 |
| EVENING | 18:00 ≦ T < 22:00 |
| MIDNIGHT | 22:00 ≦ T < 00:00 |

Fig. 9

INFORMATION DISPLAY SYSTEM FOR USE WITH A NAVIGATION SYSTEM

BACKGROUND OF THE INVENTION

1. Field of Invention

This invention relates to an information display system.

2. Description of Related Art

There are conventional navigation apparatuses for a vehicle, such as an automobile, wherein an optimum route from a user-selected departure point to a user-selected destination is searched based on road map data and the searched route is displayed on a display screen.

Further, there is provided a conventional navigation apparatus, wherein once a destination and a trip date are selected and registered by an operator, e.g., a driver or passenger of the vehicle, a route to the destination is automatically searched on that date and the searched route is automatically displayed on a display screen. Here, the destination may be, for example, a resort, a sightseeing spot, or any other intended destination; the trip date may be, for example, an upcoming day off. Once the operator designates the day off as the trip date, a route to the registered destination is automatically searched on that day off and the searched route is displayed on the display screen.

Thus, the conventional navigation apparatus can only notify the operator of an optimal route to a scheduled destination on the exact date of the trip. Thereby, on the date of the scheduled trip, the operator can check the route to the destination.

SUMMARY OF THE INVENTION

Disadvantageously, the conventional navigation apparatus is functionally limited. The route to the destination is displayed to the operator only when the date of the scheduled trip comes. This limitation deprives the operator of the opportunity to confirm his or her schedule before the date of the trip.

Further to this disadvantage, sometimes there is a case where the operator completely forgets his or her upcoming scheduled trip that has already been registered. For example, take a case where the operator is scheduled to have a Sunday drive to a resort in one month but has completely forgotten the schedule. In this case, even if a particular resort and date of a one-month-ahead Sunday are already registered as the destination and the date of the schedule, respectively, a route to that resort is not displayed on the display screen until the one-month-ahead Sunday comes. That is, the operator cannot check his or her schedule for the one-month-ahead Sunday until he or she turns on his or her navigation apparatus and views the display screen on exactly that one-month-ahead Sunday.

Further disadvantageously, the conventional navigation apparatus cannot support a rough schedule that has no specific date, for example, "Pay a bill from my bank account sometime within the next week" or "Send a parcel from the post office within one week from today." Since such a rough schedule has a certain range in date, the operator is inconvenienced because he or she must input a specific date rather than the rough schedule into the conventional navigation apparatus.

For solving the previously-described problems, the invention provides an information display system. The information display system can remind the operator of his or her previously scheduled trips when his or her vehicle is close to a specified location within a period of that previously-scheduled trip. It is the object of the invention that the information display system gives the operator a schedule reminder message and reminds the operator of his or her previously-scheduled trip before the date of that previously-scheduled trip arrives.

An information display system according to the invention includes an input device that inputs a scheduled event, a schedule storage in which the schedule is stored, a display device that displays a map, a memory that stores map information and the scheduled event, and a controller that displays a schedule reminder message on the map at a specified time before the scheduled event is to occur.

With the previously-described composition, the information display system can notify the operator at a specified time that a schedule has been registered in connection with a certain position shown on the map.

Furthermore, a method for displaying a schedule according to the invention includes inputting the schedule including a schedule location and a schedule time, displaying a location on a map, and communicating a reminder message on the map at a specified reminder time before the schedule time.

BRIEF DESCRIPTION OF THE DRAWINGS

Various embodiments of the invention will be described with reference to the drawings wherein:

FIG. 4 shows a second exemplary screen view displayed on the information terminal according to the first embodiment of the invention.

FIG. 8 shows a second exemplary screen view displayed on the information terminal according to the second embodiment of the invention.

FIG. 9 shows a third exemplary screen view displayed on the information terminal according to the second embodiment of the invention.

DETAILED DESCRIPTION OF PREFERRED EMBODIMENTS

Figure 1:
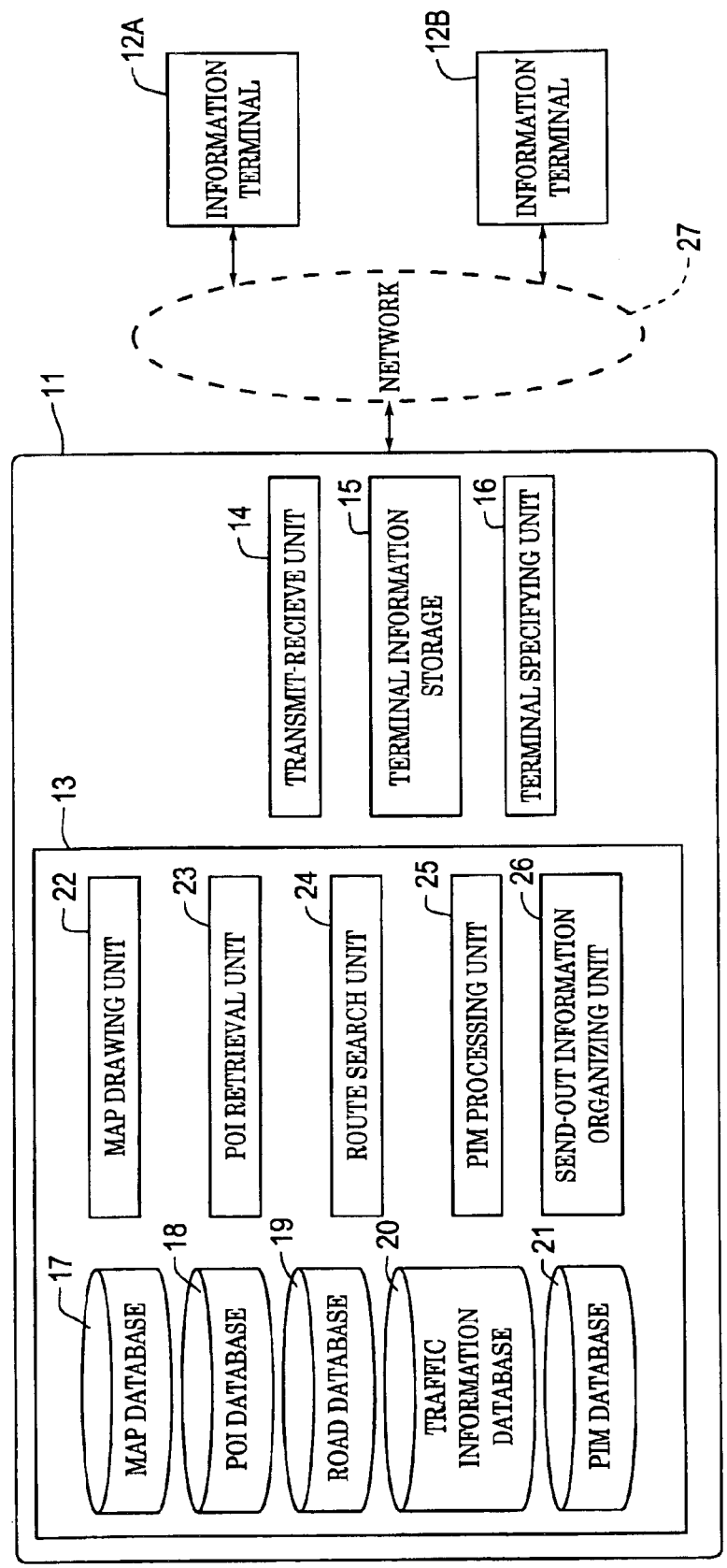
FIG. 1 shows a conceptual drawing of compositions of an information display system according to a first embodiment of the invention.

FIG. 1 shows a conceptual drawing of compositions of the information display system according to a first embodiment of the present invention.

In FIG. 1, an information source server 11 is constructed in a computer comprising processing means, such as a CPU or a MPU; storage means, such as a semiconductor memory, a magnetic disk, or an optical disk; and a communication interface. The server is not limited to a single computer but may be part of a decentralized computer network or networks in which plural computers are systematically connected one after the other. Further, together with the information source server 11, other systems may be included within the computer or computers. Additionally, the information source server 11 may be a part of a system that is constructed in a remote computer.

An information terminal 12a and an information terminal 12b are operated as a first information terminal and a second information terminal, respectively. Actually in the information display system according to the first embodiment, a plurality of information terminals may be used and operated at a time. However, for convenience of explanation, the description here takes a case where only two terminals, i.e., information terminal 12a and 12b, are used in the information display system. The operator may be, for example, a driver or passenger of a vehicle, such as an automobile, a truck, a bus, or a motorcycle, and further may be a pedestrian, a user of public transportation, or any other person.

Either information terminal 12a, 12b comprises: a main processing device, such as a CPU or an MPU; a storage device, such as a semiconductor memory, a magnetic disk, and/or an optical disk; a display device, such as a liquid crystal display, a LED (Light Emitting Diode) display, and/or a CRT; an input means, such as a keyboard, a joystick, a cross-shaped key, a push-button, a remote control, and/or a touch-sensitive panel; a display control device, by which the display device is controlled; and a transmit-receive unit, such as a communication interface.

Either information terminal 12a, 12b primarily takes the form of a navigation apparatus provided for a vehicle, such as an automobile, a truck, a bus, and a motorcycle. Further, each information terminal 12a, 12b may be, but is not limited to, a stationary telephone, a portable telephone, a personal handy phone (which uses PHS: Personal Handy-Phone System), a portable information terminal, a PDA (Personal Digital Assistant), a personal computer, a game machine, or a digital television.

Moreover, either information terminal 12a, 12b may include a present position detection device (not shown). If either information terminal 12a, 12b is, for example, a navigation apparatus that includes the present position detection device, the present position of the vehicle can be detected by using a GPS (Global Positioning System), a terrestrial magnetism sensor, a distance sensor, a steering sensor, a beacon sensor, and/or a gyro sensor. If either information terminal 12a, 12b is, for example, a portable telephone or a portable information terminal, the position of a base station for the portable telephone or the portable information terminal is detected as a present position by means of the present position detection device. For portable telephones, portable information terminals, or the like, the detection is based on communication between the present position detection device and the base station that covers an area where the portable telephone or the portable information terminal exists. Furthermore, such a portable telephone or portable information terminal may be equipped with a GPS receiver.

Under the foregoing composition, the information source server 11 is connected to the information terminals 12a, 12b via a network 27. Based on this connection, the communication between the information source server 11 and the information terminals 12a, 12b is achieved. The network 27 may be a wired or wireless public switched network, a dedicated communication network, a portable telephone network, the Internet, an intranet, a LAN (Local Area Network), a WAN (Wide Area Network), a satellite communication network, any other possible communication networks, or a certain combined network comprised of the various networks. Further, the information source server 11 may communicate with the information terminals 12a, 12b via a CS (Communication Satellite), BS (Broadcasting Satellite), ground wave digital television broadcasting, FM (Frequency Modulation) multiplex broadcasting, or may be communicated via an optical beacon or a radio wave beacon placed along roads.

Therefore, the information display system according to the first embodiment is mainly made up of the information source server 11, and the information terminals 12a, 12b. In order to use the information display system, each operator must possess an ID number and be registered with the information display system. Not only the operator but also each of the information terminals 12a, 12b must be registered with the system.

The information source server 11 comprises an information provision unit 13, from which information about a route to a destination and other various information are sent back to either terminal 12a, 12b after information about a departure point and a destination is received from either information terminal 12a, 12b; a transmit-receive unit 14, with which each information terminal 12a, 12b exchanges information; a terminal information storage 15, in which the exchanged information is independently stored for each information terminal 12a, 12b; and a terminal specifying unit 16, by which each information terminal 12a, 12b are specified based on the ID number.

The information provision unit 13 includes a map database 17, serving as a map information storage, a POI (Point of Interest) database 18; a road database 19; a traffic information database 20, serving as a traffic information storage; and a PIM Personal Information Manage) database 21, serving as a schedule storage.

The map database 17 stores map information used for drawing a map. The map information includes, for example, nodes, links, coordinates, and facility names. The POI database 18 stores facility data, telephone number-address data, event data, and the like, all of which are used for retrieving a point, such as a departure point, a destination point, or a pass-through point. The road database 19 stores data for searching a route. Specifically such data includes, for example, road search cost (here, "cost" means a weight given to data used in searching a road) and a road type.

Additionally, if the present system is used in combination with a traffic information communication system called VICS(R), the traffic information database 20 can store traffic information about traffic congestion and traffic regulations. Such traffic information is prepared based on information collected by traffic regulatory systems that the police or the Japan Highway Traffic Corporation controls. Furthermore, it is desirable that the traffic information database 20 store event schedule information about a site or a date of a scheduled event such as a festival, a parade, or a fireworks display. In addition, it is desirable that the traffic information database 20 store statistical congestion information, for example, information indicating that roads around a railway station or a commercial facility are congested every day during a certain period of time except a weekend or roads around a sea resort during a summer vacation are congested. Moreover, it is desirable that the traffic information database 20 store meteorological information, such as a weather forecast originally made by, for example, the Meteorological Agency, or a similar source.

The PIM database 21 contains personal files for respective operators. Each personal file includes attribute files (a schedule file, a calendar file, an address book file, a telephone directory file, a registered point list file, a memo file, and the like). Each attribute file stores an operator's personal information in the form of a schedule list, a calendar, an address book, a telephone directory, a registered point list, and/or a memo. Although the personal file is generally prepared for every one of the operators who have already been registered in the system, it may be prepared on an information terminal basis or on an ID number basis if one operator possesses a plurality of ID numbers.

The information source server 11 has storage means for the map database 17, the POI database 18, the road database 19, the traffic information database 20, and the PIM database 21. The storage means may be either an internal storage medium or an external storage medium. The medium may be any one of the following: a magnetic tape, a magnetic disk, a magnetic drum, a CD-ROM, a MD (Mini Disk), a DVD-ROM, a DVD-RAM, an optical disk, a MO (magneto-optical) disk, an IC card, an optical card, a stick memory, a memory card, or any other storage media.

In addition to the databases, the information provision unit 13 includes a map-drawing unit 22, by which a map is drawn based on the map information; a POI retrieval unit 23, by which positional information, for example, coordinates, an address, or a name of a registered location (as a destination), is retrieved based on the information stored in the POI database 18; and a route search unit 24, by which a route from a present position of the vehicle or operator to a destination is searched based on information stored in the road database 19 or based on information stored in the traffic information database 20.

Furthermore, the information provision unit 13 includes a PIM processing unit 25, by which the operator's schedule list, calendar, address book, telephone directory, registered point list, memo, and the like are prepared and updated based on the information sent from the information terminals 12a, 12b. The PIM processing unit 25 also extracts information from the schedule list, calendar, address book, telephone directory, registered point list, memo, and the like stored in the PIM database 21. In addition, the information provision unit 13 includes a send-out information organizing unit 26 by which information to be sent out to the terminals 12a, 12b is organized and edited.

Moreover, the information provision unit 13 includes a destination-setting unit, an estimated arrival time calculating unit, and a comparing unit (these are not shown). Additionally, the information provision unit 13 stores several programs such as a PIM program and a route search program. According to the first embodiment, the PIM program manages a schedule list, a calendar, an address book, a telephone directory, a registered point list, a memo, and the like, all of which are useable in the portable information terminals, PDAs, and personal computers.

If the positional information (a destination, a pass-through point, or a registered point) is registered in the schedule list, the address book, the telephone directory, the registered point list, or the memo, a destination is selected by means of the destination-setting unit. The estimated arrival time calculating unit calculates the estimated arrival time at which the user reaches the destination based on the information about the route searched by the route search unit 24. For example, the estimated arrival time is calculated based on the departure time and the sum of the time required for traveling each road segment that leads to the destination.

The estimated arrival time may be recalculated and updated at specified time intervals. In some cases, the recalculation and update may take into consideration the latest traffic congestion information as well as the latest traffic regulatory information, both of which are stored in the traffic information database 20. After the recalculation of the estimated arrival time, the comparing unit starts to compare the recalculated estimated arrival time with the operator's desired arrival time.

Either information terminal 12a, 12b may include a transmit-receive unit and a display control device (not shown), whereby the information inputted in the schedule list, calendar, address book, telephone directory, registered point list, memo, and other information are transmitted or received to or from the information source server 11. In either information terminal 12a, 12b, both the calendar and the map transmitted from the information source server 11 are displayed on the display device by means of the display control device. Further, the display control device displays a present position, a destination, and a facility located around the present position onto the calendar and the map. At the same time, it is desirable that the following information is also displayed on the calendar and the map: the desired arrival time, the estimated arrival time, the destination name, the destination address, the facility data, the telephone number and address data, the event data, road traffic information, the event schedule information, the statistical traffic congestion information, the meteorological information, and the like.

According to the first embodiment, the information source server 11 having, for example, the map database 17, the PIM database 21, the route search unit 24, and the PIM processing unit 25 works as the main part of the information display system. In response to a request from either information terminal 12a, 12b, the information source server 11 carries out the route search, as well as a preparation, update, or edit of the schedule list, calendar, address book, telephone directory, registered point list, memo, and the like. The results of the route search, as well as the preparation, update, or edit may be transmitted back to either information terminal 12a, 12b. Since the information source server 11 works as the main part of the information display system in this exemplary case, a compositional simplification and a downsizing of the information terminals 12a, 12b may be achieved, thereby lowering manufacturing costs of the information terminals 12a, 12b.

Likewise, for economical reasons, instead of the information source server 11, the information terminals 12a, 12b may include the map database 17 and the route search unit 24 in order to carry out the route search. In such a case, either information terminal 12a, 12b would work as the main part of the information display system. This leads to a compositional simplification of the information source server 11 and contributes to the reduction of running costs of the information display system.

Further, in other circumstances, instead of the information source server 11, the information terminals 12a, 12b may include the POI database 18, the road database 19, the traffic information database 20, the PIM database 21, the POI retrieval unit 23, the PIM processing unit 25, the destination-setting unit, the estimated arrival time calculating unit, and the comparing unit.

Next, the operations of the information display system according to the first embodiment will be described.

For simplicity of explanation, the description takes a case where the information source server 11 comprises the map database 17, the POI database 18, the traffic information database 20, the PIM database 21, the route search unit 24, and the PIM processing unit 25. The route search as well as the preparation, update, or edit of the schedule list, calendar, address book, telephone directory, registered point list, memo, and the like, are carried out by the information source server 11 and then the results are transmitted back to information terminal 12b in response to the request from the information terminal 12a.

Suppose that information terminal 12a is a portable telephone or a telephone for PHS (Personal Handy phone System), information terminal 12b is a navigation apparatus aboard a vehicle, and the information terminals 12a, 12b are both operated by one operator.

Figure 2:
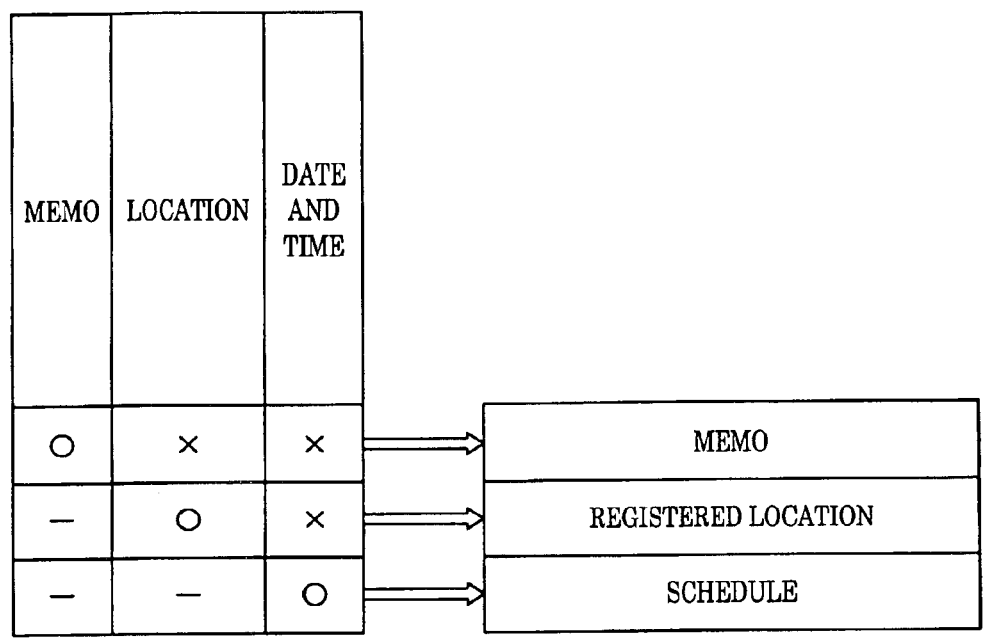
FIG. 2 shows a process of file classification carried out by a PIM processing unit according to the first embodiment of the invention.
Figure 3:
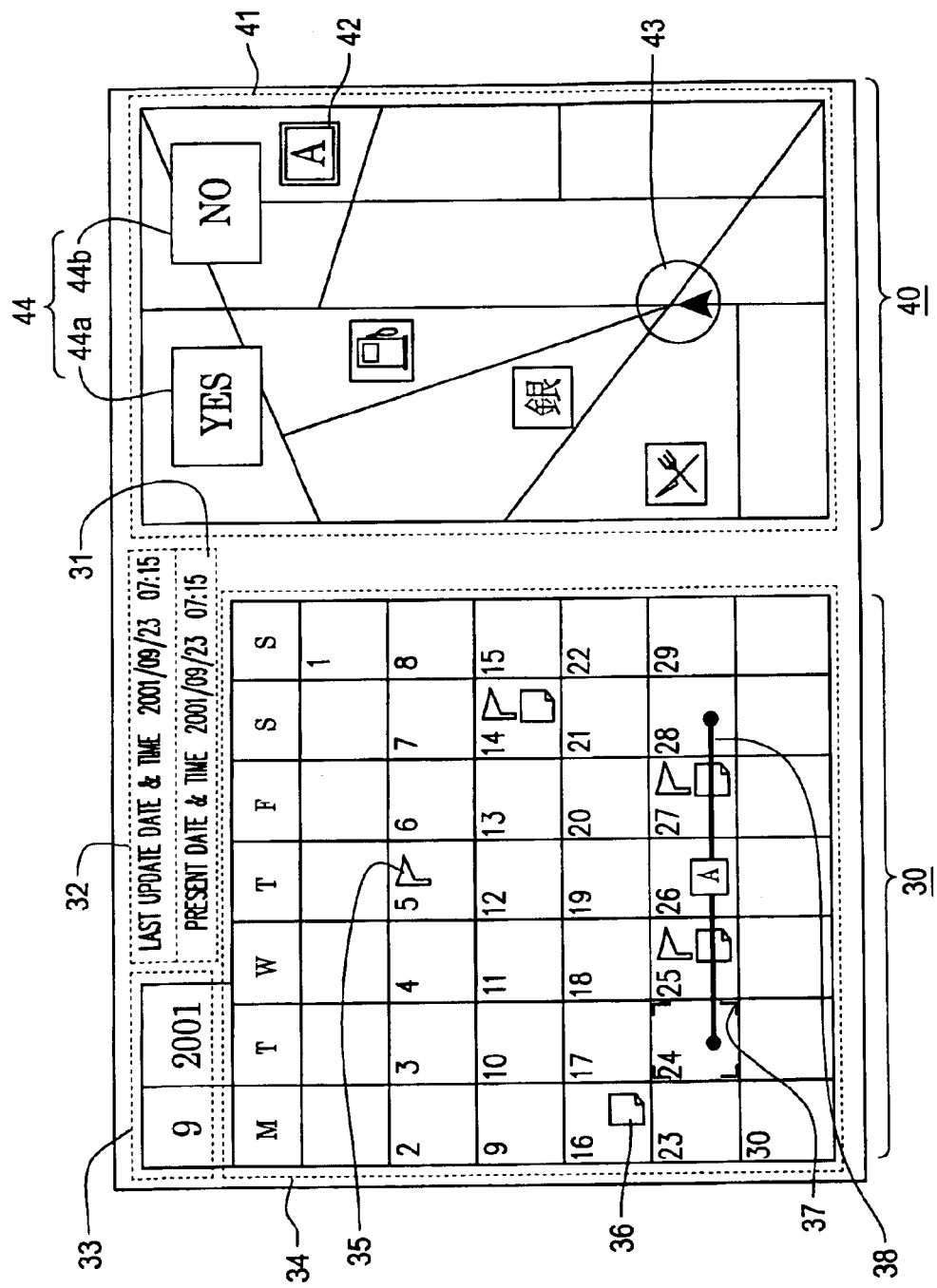
FIG. 3 shows a first exemplary screen view displayed on an information terminal according to a first embodiment of the invention.
Figure 5:
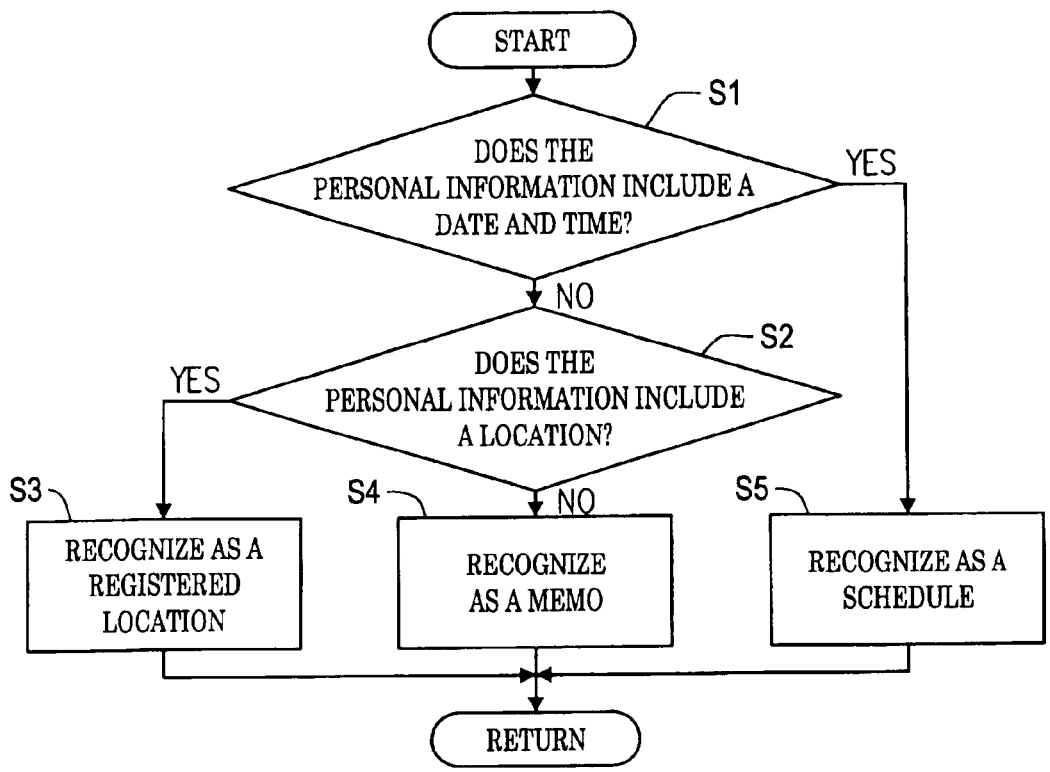
FIG. 5 is a flowchart showing a process of the file classification carried out by the PIM processing unit according to the first embodiment of the invention.
Figure 6:
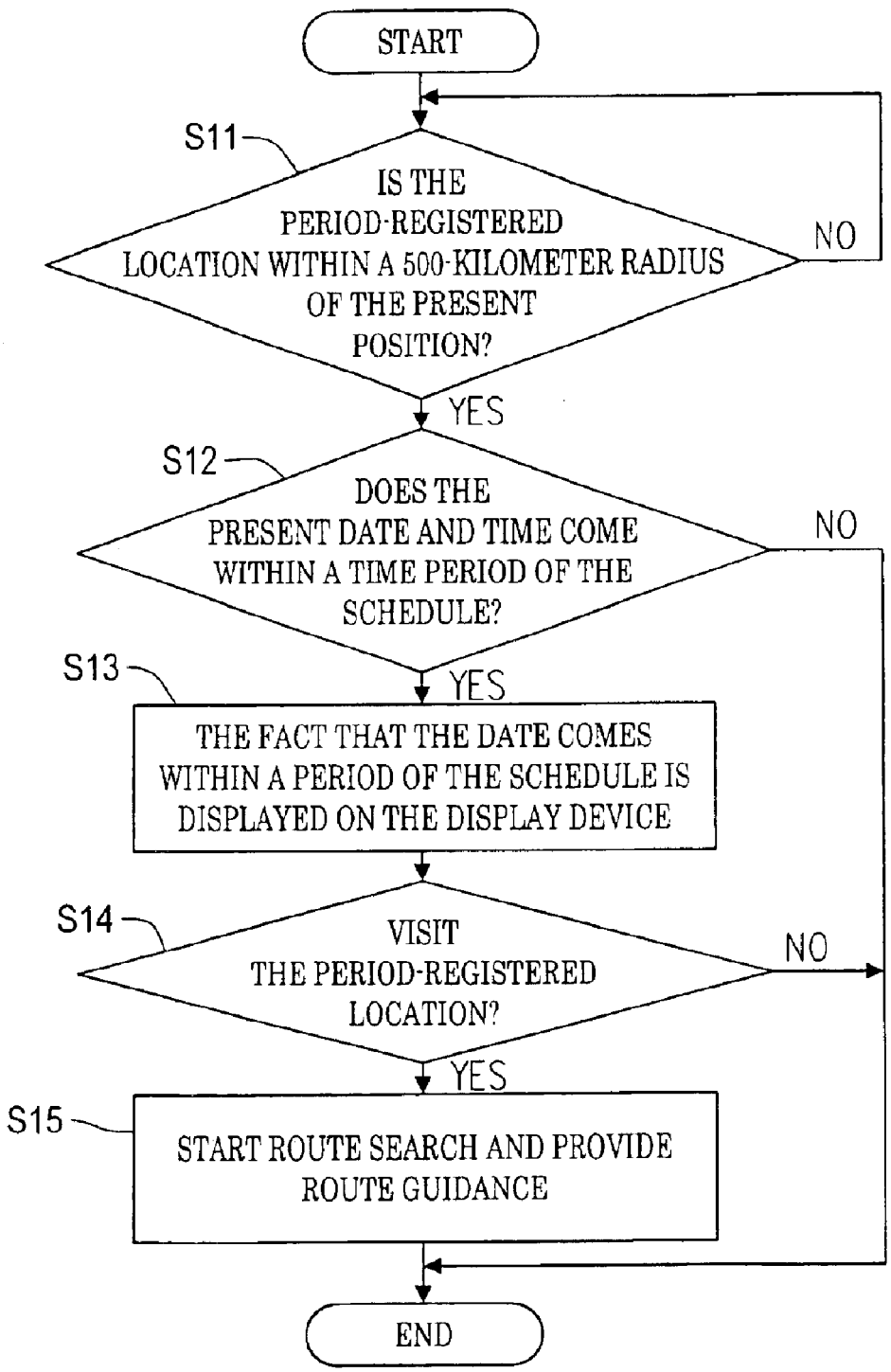
FIG. 6 is a flowchart showing a process of information display according to the first embodiment of the invention.

The operations of the information display system will be described with reference to the following figures. FIG. 2 shows a process of file classification carried out by a PIM processing unit according to the first embodiment of the invention. FIG. 3 shows a first exemplary screen view displayed on an information terminal according to a first embodiment of the invention. FIG. 4 shows a second exemplary screen view displayed on the information terminal according to the first embodiment of the invention. FIG. 5 is a flowchart showing a process of the file classification carried out by the PIM processing unit according to the first embodiment of the invention. FIG. 6 is a flowchart showing a process of information display according to the first embodiment of the invention.

According to the first embodiment, first the information terminal 12a is operated to input the operator's personal information. For this example, the operator's personal information comprises schedules to be inputted into a schedule list, the calendar, the address book, the telephone directory, the registered point list, the memo, and the like. The operator inputs the schedules for a next month including, for example, work activities, study activities, hobbies, a drive, a trip, recreational activities, sports, dining, or sightseeing. These schedules are defined so that a site, a destination, or a location of a facility is associated with a specified time period. For example, the site and the specified time period are associated with each other in the schedule as follows: "Build Mr. XX's house by the end of the next month," "Go to the library and borrow some books within a few days," "Visit XX office within this month," "Go to a pharmacy and buy medicine sometime this week," "Pay a bill from my bank account within the next week," or "Send a parcel from the post office within one week from today."

For inputting schedules, first the PIM program, stored in information terminal 12a, is started. With the start of the PIM program, a schedule input view is displayed on the display device in the information terminal 12a.

If the PIM program is not stored in the information terminal 12a, the information terminal 12a will access the information source server 11 via the network 27. Upon accessing the information source server 11, the PIM program stored in the information source server 11 is started and the schedule input view is obtained and displayed on the display device in the information terminal 12a.

Then, the schedule is inputted on the schedule input view. The schedule input view has some dialog boxes to input or specify a time period of the schedule, a location of the schedule, a description of the schedule, and a memo about the schedule. For the schedule input, it is preferable that a Japanese-syllable input palette be displayed on the schedule input view. In this case, said period, location, description or memo can be inputted on a syllable-by-syllable basis from the Japanese-syllable input palette. Further, it is preferable that an alphanumeric input palette be displayed for the input of telephone numbers or addresses. In this case, the telephone number or the address may be inputted on an alphanumeric basis.

Furthermore, there is another alternative way of inputting the schedule when the PIM processing unit 25 in the information source server 11 has a keyword-extracting function. The keyword-extracting function is such that keywords associated with the period of the schedule or the location of the schedule are extracted from sentences written by a natural language. In this case, the schedule input view has a single dialog box to input the sentences such as a memo or a note including the time period or the location. When the sentences written by natural language are inputted into the single dialog box, the PIM processing unit 25 starts to extract the keywords associated with the time period of the schedule or the location of the schedule from those sentences. Thereafter, the PIM processing unit 25 automatically allocates the extracted keyword, such as the time period of the schedule or the location of the schedule to each corresponding dialog box. When inputting the schedule into the dialogue box, the time period of the schedule does not have to be defined by both a date and a time. It may also be defined by either a date or a time. Likewise, the location of the schedule may not have to be defined by an accurate address or precise positional coordinates. Furthermore, it is possible to skip the description of the schedule and/or the memo about the schedule.

After the schedule input is finished, the information terminal 12a is operated to transmit the inputted schedule to the information source server 11 via the network 27. In the information source server 11, the transmit-receive unit 14 receives the schedule from the information terminal 12a. The terminal specifying unit 16 extracts the ID number from that transmitted schedule to specify the personal file, corresponding to the information terminal 12a, stored in the PIM database 21. The personal file is prepared corresponding to each operator so that the ID number can specify the operator.

In addition to the ID number, the time period of the schedule, the location of the schedule, the description of the schedule, and/or the memo about the schedule are extracted from the schedule transmitted from the information terminal 12a by means of the PIM processing unit 25. Upon this extraction, the PIM processing unit 25 accesses the POI retrieval unit 23 to obtain the positional coordinates of the location of the schedule. After the acquisition of the positional coordinates, the PIM processing unit 25 accesses the personal file specified by the terminal specifying unit 16, that is stored in the PIM database 21. Then, the extracted information, such as, the time period of the schedule, the position of the schedule, the description of the schedule, and/or the memo about the schedule, is stored into the specified personal file. In that specified personal file, according to the first embodiment, the location of the schedule (including positional coordinates), the description of the schedule, and/or the memo about the schedule are registered in association with the time period of the schedule. Thus, the schedule inputted by the operator can be registered in the personal file stored in the PIM database 21.

In this connection, hereinafter the operations of the PIM processing unit 25 will be described in detail.

When the personal information (schedule) is inputted, the PIM processing unit 25 starts to store the inputted personal information into the personal file that corresponds to the operator and is stored in the PIM database 21. In this process, at first the PIM processing unit 25 determines whether the inputted personal information is defined by a date and time. If the personal information is defined by a date and time, it is recognized that the inputted personal information has an attribute of a schedule. If the personal information is not defined by a date and time, then the PIM processing unit 25 determines whether the inputted personal information is defined by a location. If the personal information is defined by a location, it is recognized that the inputted personal information has an attribute of a registered location. If the personal information is not defined by a location, it is recognized that the inputted personal information has an attribute of a memo.

The relationship between the inputted personal information and the attributes is illustrated in FIG. 2. In FIG. 2, ○ tells "Defined," x tells "Not defined," and—tells "Not affecting the attribute." For example, take the top row of FIG. 2. This row shows that the inputted personal information is defined by only a memo and not defined by a location as well as a date and time. In such case, it is determined that the inputted personal information has an attribute of a memo as shown in FIG. 2. Next, take the middle row of FIG. 2. This middle row shows that the inputted personal information is defined by a location and not defined by a date and time. In such case, it is determined that the inputted personal information has an attribute of a registered location as shown in FIG. 2. Further, take the bottom row of FIG. 2. The bottom row shows that the inputted personal information is only defined by a date and time. In such case, it is determined that the inputted personal information has an attribute of a schedule as in FIG. 2.

After the determination of the attribute, the PIM processing unit 25 accesses the personal file that is stored in the PIM database 21 and specified by the terminal-specifying unit 16. Then, the personal information is stored into that specified personal file. In detail, the personal information having the attribute of a memo is stored into the memo file, the personal information having the attribute of a registered location is stored into the registered location file, and the personal information having the attribute of schedule is stored into the schedule file. When the personal information is defined by the location of the schedule, the PIM processing unit 25 accesses the POI retrieval unit 23 to obtain the positional coordinates of that location. Thus, the personal information inputted by the operator can be classified into three categories: a memo, a registered location, and a schedule. The classified information is registered in its corresponding attribute file contained in the personal file. This personal file stored in the PIM database 21 is prepared for each operator. Once the personal information is inputted, the operator can confirm his or her schedule at any time he or she likes.

The next description centers on operations of confirming the operator's schedule for one month by operating the information terminal 12b.

In order to confirm this schedule, first, the operator transmits a request for the schedule from the information terminal 12b to the information source server 11 via the network 27. The transmit-receive unit 14 receives that request from the information terminal 12b. Upon the receipt of the request, the terminal specifying unit 16 extracts the ID number from the transmitted request in order to specify the personal file, stored in the PIM database 21, that corresponds to the terminal 12b. Again, the personal file is prepared corresponding to each operator so that the ID number may specify each operator.

Subsequently, the PIM processing unit 25 extracts the personal information for one month from the schedule file contained in the specified personal file. The extracted information undergoes data transformation through the send-out information-organizing unit 26 and then is transmitted from the transmit-receive unit 14 to the information terminal 12b. If the PIM program is not stored in the information terminal 12b, the PIM program is sent out in addition to the data-transformed extracted information to the information terminal 12b.

Upon the receipt of the data-transformed personal information, the display control device in the information terminal 12b allows the display device to display the data-transformed personal information onto a schedule panel 30 as shown in FIG. 3. On the schedule panel 30, a calendar 34 showing September 2001 is displayed. The schedule panel 30 includes present date and time 31 (year/month/day/hour/minute), last update date and time 32 (year/month/day/hour/minute) when the schedule was last updated, and a calendar month (month/year) 33.

Further, a date icon 35 displayed within each date rectangle in the calendar 34 indicates that a location of a schedule has already been registered in connection with its related date. A memo icon 36 displayed within each date rectangle indicates that a memo about a schedule has already been registered in connection with its related date. Each date rectangle is surrounded by a cursor 37 so that the date rectangle may be highlighted in a bold line. A period indicator 38 shows a time period of a schedule related to a period-registered location icon 42 (described later). The period indicator 38 can take various forms. For example, it may be a frame that surrounds the date rectangles of all dates within a certain period of the schedule, a bar stretched across the date rectangles of all dates within a certain period of the schedule as shown in FIG. 3, or color applied to the date rectangles of all dates within a certain period of the schedule.

In addition to the schedule panel 30, a map panel 40 is displayed on the display device by means of the display control device in the information terminal 12b, as shown in FIG. 3. Here, as one example of the first embodiment, a map 41 depicting an area around the present position of the information terminal 12b is displayed on the map panel 40. On the map panel 40, a present position icon 43 shows the present position of the information terminal 12b, and the period-registered location icon 42 shows the period-registered location that is registered in connection with a time period of the schedule. It is desirable that a destination, for example, a pass-through point, a registered location where the operator frequently visits, a facility such as a post office or a restaurant, or a landmark also be displayed on the map 41.

In the first embodiment, the period-registered location icon 42 that is located within a specified range with reference to the present position of the information terminal 12b is displayed on the map 41. Such specified range, for example, covers over an N-kilometer radius of the present position of the information terminal 12b. The value of N is changeable. The operator can confirm any period-registered location as far as it exists within the range defined by N.

In confirming the period-registered locations, any registered points inputted from the schedule input view or any arbitrary points on the map may serve as the present position of the information terminal 12b. Therefore, the operator could confirm the icon 42 located within the area with reference to an inputted registered point or an arbitrary point on the map. That is, in substitution for the present position any points may be optionally selected, and thereby the period-registered locations within the area with reference to such any points may be informed to the operator.

Hereinafter, the description assumes that the information terminal 12b is the present position and the radius N is 0.5 kilometers. In this case, the period-registered location icon 42, located within a 500-meter radius of the present position of the information terminal 12b, is displayed on the map 41.

The period-registered location icon 42 is displayed on the map 41 at the same time the period indicator 38 is displayed on the calendar 34 as shown in FIG. 3. In FIG. 3, the period indicator 38 shows the time period of the schedule in connection with the period-registered location icon 42. That is, the operator is scheduled to visit the location indicated by the period-registered location icon 42 somewhere during the time period shown by the period indicator 38. However, the period-registered location icon 42 is not displayed on the map 41 even when the period-registered location exists within the 500-meter radius of the present position if the date indicated by the present date and time 31 has not yet not come within the time period indicated by the period indicator 38.

In other words, the period-registered location icon 42, reminding the operator of the schedule, is not displayed on the map 41 unless the date indicated by the present date and time 31 comes within the time period indicated by the period indicator 38.

Furthermore, when the period-registered location icon 42, that reminds the operator of the schedule, is displayed on the map 41, there appears an optional button 44 to determine whether to visit the period-registered location. The optional button 44 comprises a "Yes" button 44a and a "No" button 44b. The operator can determine whether to visit the period-registered location by clicking the cursor 37 on either the "Yes" button 44a or the "No" button 44b. Alternatively, the optional button 44 may take the form of a single button. In this case, when the cursor 37 is clicked on the button 44, it is determined that the operator would like to visit the period-registered location.

When the cursor 37 is placed on the optional button 44 and clicked to determine to visit the period-registered location, the determination result is transmitted from the information terminal 12b to the information source server 11. In response to the determination result, the route search unit 24 starts to search a route from the present position shown by the present position icon 43 to the registered location shown by the period-registered location icon 42. The searched route is transmitted from the transmit-receive unit 14 in the information source server 11 to the information terminal 12b, and as a result, route guidance on that searched route is started. This route guidance may be visually given to the operator through the display of the searched route on the map 41, or alternatively given audibly.

When the cursor 37 is clicked on the "No" button 44b, to determine not to visit the period-registered location, no route search is carried out, and therefore no route guidance is given to the operator.

The cursor 37 is moved around the screen with the operation of the input device provided in the information terminal 12b. The cursor 37 moves upward, downward, rightward, or leftward to the desired date rectangle with the operation of, for example, a joystick or a cross-shaped key. Alternatively, the cursor 37 may be moved to a desired date rectangle by inputting numerals that represent the desired date. If the display device takes the form of a touch-sensitive panel, the cursor 37 is moved at the touch of the date rectangle. In FIG. 3, the cursor 37 is placed on the date of September 24 as indicated by the present date and time 31.

If the cursor 37 is moved upwards beyond the top row of the calendar 34, the calendar 34 scrolls to the previous month (August). On the contrary, if the cursor 37 is moved downward beyond the bottom row of the calendar 34, the calendar 34 scrolls to the next month (October).

The description hereinafter centers on operations of displaying a schedule screen 50 on the schedule panel 30. When the cursor 37 is clicked on any one of the date rectangles specified by the period indicator 38 (for example, any date from September 24 to September 28 as shown in FIG. 3), the display control device in the information terminal 12b allows the schedule screen 50 as shown in FIG. 4 come up on the schedule panel 30. The schedule screen 50 details the schedule for one of the dates specified by the period indicator 38.

It is desirable that the schedule panel 30 and the map panel 40 be simultaneously displayed vertically or horizontally side by side on the display device. However, if the size of the display device is small, the schedule panel 30 and the map panel 40 may be separately displayed from one another. In other circumstances, the map panel 40 is closed and the schedule panel 30 is displayed alone.

The schedule screen 50 has a reminder-timing box 51 as shown in FIG. 4. This box 51 tells the operator whether the time to visually or audibly remind him or her of the schedule has already come within the time period of the schedule. Further, the schedule screen 50 includes: a schedule date and time box 52, in which the period of the schedule is shown; a location name box 53, in which a name of the location of the schedule is shown; a memo box 54, in which the description of the schedule is shown; an address box 55, in which an address at the location of the schedule is shown; a telephone number box 56, in which a telephone number to be referred to is shown; an input date box 57, in which the date when the schedule is inputted is shown; a sender name box 58, in which a name of a sender is shown if the schedule is sent by someone from outside to the operator (this will be described hereinafter); and a send date box 59, in which the date when the schedule is sent from outside to the operator is shown.

Thus, from the schedule screen 50, the operator can make sure of the details of his or her schedule that have already been inputted and registered.

Next, the description centers on operations of editing the registered schedule.

According to the first embodiment, the operator may edit the registered schedules. To edit a schedule, first, the schedule input view is displayed onto the display device in the information terminal 12a. Then, the operator selects the schedule to be edited and that schedule is displayed on the schedule input view. On the schedule input view, the schedule can be changed or erased, or a new item can be added. The editing is carried out in the same way as the schedule is newly inputted. For example, the operator may revise the date and time of the schedule, the location of the schedule, or the memo about the schedule in each dialog box. Additionally, if the personal information (schedule) has been inputted in the form of natural language sentences, the operator may revise such sentences so as to change his or her schedule.

After editing, the edited schedule is transmitted from the information terminal 12a to the information source server 11 via the network 27. The transmit-receive unit 14 receives the edited schedule from the information terminal 12a. The terminal specifying unit 16 operates in the same manner as if a new schedule were inputted. Thereby, the personal file, that corresponds to the information terminal 12a and is stored in the PIM database 21 is specified. Subsequently, the PIM processing unit 25 selects and accesses said specified personal file from the personal files stored in the PIM database 21. Then, the edited schedule is stored into that selected personal file.

Thus, the schedule, having already been registered, is edited in a similar manner as a new schedule is inputted. Therefore, editing the registered schedule is an easy operation for the operator.

According to the first embodiment, the map 41 may be swiftly drawn and displayed on the display device in the information terminal 12b if the information terminal 12b stores the map information in its storage device and includes a map-drawing unit 22. By contrast, when the information terminal 12b neither stores the map information nor includes the map-drawing unit 22, a request for drawing the map 41 is transmitted together with data about the location of the schedule from the information terminal 12b to the information source server 11 via the network 27. Upon receipt of such request and the data about the location of the schedule, the map-drawing unit 22 in the information source server 11 accesses the map database 17 in order to draw the map 41 that shows the period-registered location icon 42, the present position icon 43, and the optional button 44. Then, the drawn map 41 is data-transformed through the send-out information-organizing unit 26. The transformed map is transmitted from the transmit-receive unit 14 to the information terminal 12b and displayed onto the display device in the information terminal 12b.

Alternatively, the map 41 may be drawn at the moment when the schedule inputted by the operator is registered in the personal file. In this case, the PIM processing unit 25 extracts the location of the schedule from the inputted schedule and transmits the extracted location to the map-drawing unit 22 in order that the map 41, covering the extracted location, may be drawn. After it is drawn, the map 41 is stored with the location and the date of the schedule, into the operator's personal file in the PIM database 21 by means of the PIM processing unit 25. In this case, when the schedule is transmitted from the information source server 11 to the information terminal 12b in answer to the request from the information terminal 12b, the map 41 may be transmitted together with that schedule to the terminal 12b. Thereby, the map 41 covering the registered location of the schedule is swiftly displayed onto the map panel 40 even if the information terminal 12b has neither the map-drawing unit 22 nor the map information.

Additionally, facilities around the location of the schedule may be retrieved and displayed on the map 41. Usually, when a type of the facility related to the schedule is inputted, those type of facilities around the location of the schedule are retrieved. For example, when the information terminal 12b includes the POI retrieval unit 23 and has POI information stored in its storage means, the facilities around the location of the schedule may be retrieved and displayed onto the display device in the information terminal 12b.

By contrast, when the information terminal 12b neither includes the POI retrieval unit 23 nor has POI information stored in its storage means, a request for the retrieval of the facility is transmitted together with data about the location of the schedule from the information terminal 12b to the information source server 11 via the network 27. Upon receipt of the request and the data about the location of the schedule, the POI retrieval unit 23 in the information source server 11 accesses the POI database 18 to retrieve the facility around the location of the schedule. Then, the retrieved facility is data-transformed through the send-out information-organizing unit 26. The data-transformed facility that is transmitted from the transmit-receive unit 14 to the information terminal 12b and displayed on the display device in the information terminal 12b.

Alternatively, the facility may be retrieved at the moment when the schedule, inputted by the operator, is registered in the personal file. In this case, the PIM processing unit 25 extracts the location of the schedule from the inputted schedule and transmits it to the POI retrieval unit 23 in order that the facilities around the location of the schedule may be retrieved. After being retrieved, such retrieved facilities are stored by means of the PIM processing unit 25, in connection with the location and the date of the schedule, into the operator's personal file in the PIM database 21.

In this case, when the schedule is transmitted from the information source server 11 to the information terminal 12b in response to a request from the information terminal 12b, the retrieved facility may be transmitted together with that schedule to the information terminal 12b. Thereby, the facility around the location of the schedule may be swiftly displayed onto the map panel 40 even if the information terminal 12b has neither the POI retrieval unit 23 nor the POI information.

Further, a route to the location of the schedule may be searched and displayed onto the map 41. Such route is generally searched based on both a location of the schedule and an operator's house respectively regarded as a destination and a departure point. However, instead of these general points, as needed, any points can be designated as the destination or as the departure point. When the information terminal 12b includes the route search unit 24 and the road information in its storage means, the information terminal 12b may search a route to the location of the schedule and display the searched route onto the display device.

By contrast, when the information terminal 12b includes neither the route search unit 24 nor the road information, a request for the route search is transmitted together with the data about the location of the schedule from the information terminal 12b to the information source server 11 over the network 27. Upon receipt of the request and the data about the location of the schedule, the route search unit 24 accesses the road database 19 to search a route to the location of schedule. Then, the searched route is data-transformed through the send-out information-organizing unit 26. The data-transformed route is transmitted from the transmit-receive unit 14 to the information terminal 12b and then displayed on the display device in the information terminal 12b.

Furthermore, the route may be searched at the moment when the schedule inputted by the operator is registered in the personal file. In this case, the PIM processing unit 25 extracts the location of the schedule from the inputted schedule and transmits it to the route search unit 24 in order that a route to the location of the schedule may be searched. After being searched, the searched route is stored, by means of the PIM processing unit 25, in connection with the location and the date of the schedule into the operator's personal file in the PIM database 21. In this case, when the schedule is transmitted from the information source server 11 to the information terminal 12b in answer to the request from the information terminal 12b, the searched route may be transmitted together with that schedule to the information terminal 12b. Thereby, the route to the location of the schedule may be swiftly displayed onto the map 41 by means of the information terminal 12b even if the information terminal 12b has neither the route search unit 24 nor the road information.

In searching a route, not only the road database 19 but also the traffic information database 20 may be accessed by the route search unit 24 in order to refer to the traffic information such as the congestion information or the traffic regulatory information stored in the database 20. In this case, the route search unit 24 may search a route allowing for the traffic congestion that is predicted based on the accumulated statistical congestion information or scheduled event information.

For example, assume the vehicle follows a road around a rail station or a mega commercial facility and it is statistically confirmed that the road is congested everyday except a weekend during a certain time period, such as in the evening. In this case, the route search unit 24 might search a route that excludes the congested road from the search results. In addition, the route search unit 24 might search the route so that roads around a scheduled event site of a festival, a parade, or a fireworks display could be excluded from the search results, allowing for the predicted traffic congestion around such event site.

Furthermore, the route search unit 24 may search a route based on the meteorological information, such as a weather forecast, that is stored in the traffic information database 20. For example, when heavy rain is predicted, the route search unit 24 might perform the route search so that a mountain route on which weather related accidents frequently occur could be excluded from the search results.

Further, there is still another way of searching a route in a case where the information terminal 12b includes the route search unit 24 as well as includes the traffic information such as the traffic regulation or the traffic congestion, the accumulated statistical congestion information, the scheduled event information, and/or the meteorological information stored in its storage means. In this case, without transmitting a request for a route search to the information source server 11, the terminal 12b alone can search a route by referring to said traffic information, statistical congestion information, scheduled event information, and/or meteorological information.

In this connection, when the operator designates a date by the cursor 37, the information terminal 12b displays onto the display device the map 41 covering the registered location related to the designated date. At the same time, the traffic information, the statistical congestion information, the scheduled event information, and/or the meteorological information, each of which is related to that designated date can be superimposed along the road on the map 41.

For this superimposition, the following operations are required. First, the information terminal 12b transmits a request for the traffic information, the statistical congestion information, the scheduled event information, or the meteorological information, together with the data about the registered location, to the information source server 11. Upon the receipt of the request and the data about the registered location, the route search unit 24 in the information source server 11 accesses the traffic information database 20 and predicts the occurrence of the traffic congestion or the traffic regulation around the registered location. This prediction is based on the accumulated statistical congestion information as to the roads around the registered location and the scheduled event information. In detail, the occurrence of the traffic congestion or the traffic regulation is predicted allowing for the day, season, or time of the schedule. Then, such prediction about traffic congestion or the traffic regulation is data-transformed through the send-out information-organizing unit 26. The transformed predicted information is transmitted from the transmit-receive unit 14 to the information terminal 12b and then displayed on the display device in the information terminal 12b.

In this regard, it is possible to store the predicted traffic information into the operator's personal file in the PIM database 21 in a manner that the registered location and the designated date are associated with the predicted traffic information.

Further, in the aforesaid case where the traffic information such as the traffic congestion information, the traffic regulation information, the accumulated statistical congestion information, or the scheduled event information is stored in the storage device in the information terminal 12b, the information terminal 12b alone may predict the traffic information without transmitting the request for it to the information source server 11.

In this connection, when the operator designates a date by the cursor 37, the information terminal 12b displays onto the display device the map 41 that covers the registered location related to the designated date. At the same time, the meteorological information related to that designated date may be superimposed along the road displayed on the map 41.

For the superimposition of meteorological information, the following operations are required. First, the information terminal 12b transmits a request for the traffic information together with the data about the registered location to the information source server 11. Upon the receipt of the request and the data about the registered location, the route search unit 24 in the information source server 11 accesses the traffic information database 20 to obtain the meteorological information, such as the weather forecast for the area around the registered location. Then, the meteorological information for that area on the designated date is data-transformed through the send-out information-organizing unit 26. The data-transformed meteorological information is transmitted from the transmit-receive unit 14 to the information terminal 12b and then displayed onto the display device in the information terminal 12b.

In this regard, it is possible to store the meteorological information into the operator's personal file in the PIM database 21 in a manner that the registered location and the designated date are associated with the meteorological information.

When the information terminal 12b stores the meteorological information such as the weather forecast in its storage device, the information terminal 12b alone may display the meteorological information onto the display device without transmission of the request for the meteorological information to the information source server 11.

Thus, once the date is designated, the traffic information or the meteorological information for the area around the registered location associated with the designated date may be displayed on the display device. By referring to such traffic information or the meteorological information on the display device, the operator may confirm or change his or her schedule.

According to the first embodiment, not only the designation of the date, but also the designation of the road can trigger a display of the traffic information about the road. When a certain road on the map 41 is designated, the traffic information about such designated road may be displayed on the calendar 34.

In this case, from the information terminal 12b to the information source server 11 a request for the traffic information is transmitted together with the road data about the designated road. Upon the receipt of such request and the road data, the route search unit 24 in the information source server 11 accesses the traffic information database 20 in order to predict the occurrence of the traffic congestion or the traffic regulation on the designated road. This prediction is based on the accumulated statistical congestion information or the scheduled event information as to the designated road. If it is predicted that the designated road will suffer from traffic congestion or it is predicted that the designated road will be controlled by traffic regulation, the date of such congestion or regulation is retrieved from the traffic information database 20. Then, the date of congestion or regulation is data-transformed through the send-out information-organizing unit 26. The data-transformed date is transmitted from the transmit-receive unit 14 to the information terminal 12b and displayed on the display device in the information terminal 12b.

For example, assume an autumn festival is scheduled for September 28 in a certain area around a road designated by the operator and it is predicted that the designated road will suffer from the traffic congestion on September 28. In this case, the display of the date rectangle for September 28 in the calendar 34 changes in a certain way. The changed display tells the operator that the designated road will suffer from the congestion on September 28. Accordingly, the operator can change his or her schedule if need be.

The previously-described first embodiment takes the case where the schedule is inputted from the information terminal 12a and confirmed on the information terminal 12b, however the present invention is not limited to such case. In opposite manner, the schedule may be inputted from the information terminal 12b and confirmed on the information terminal 12a. Further, both the input of the schedule and the confirmation of the schedule may be carried out on one single information terminal. Furthermore, the schedules may be inputted and confirmed without access to the information source server 11 if the single information terminal comprises the POI database 18, the road database 19, the traffic information database 20, the PIM database 21, the POI retrieval unit 23, the PIM processing unit 25, the destination-setting unit, the estimated arrival time calculating unit, and the comparing unit.

The foregoing of the first embodiment take the case where the oncoming schedules are confirmed. However, according to the first embodiment, not only such oncoming schedules but also past schedules may be confirmed insofar as the information stored in the PIM database 21 is not erased. That is, the past schedules can be displayed when the specific site point, destination point, or facility point related to the past schedules including a drive, a trip, recreations, sports, eat-out, or sightseeing, is inputted together with its corresponding date of the schedule. According to the invention, not only the oncoming schedule but also the past schedule can be displayed onto the display device.

Hereinafter, the flowcharts shown in FIG. 5 and FIG. 6 will be described.

First, a flowchart showing a process of file classification of the personal information followed by the PIM processing unit 25 is described by referring to FIG. 5. In step S1, it is determined whether the personal information (schedule) inputted by the operator includes a date and time. If the date and time are included, operation of the flowchart jumps to step S5. If the date and time are not included, operation continues to Step S2.

Next in step S2, it is determined whether the inputted personal information includes a location. If the location is included, operation of the flowchart continues to step S3. If the location is not included, operation jumps to step S4.

In step S3, the inputted personal information is recognized as having an attribute of a registered location. In step S4, the inputted personal information is recognized as having an attribute of a memo.

Finally, in step S5, the inputted personal information is recognized as having an attribute of a schedule.

Next, a flowchart showing a process for displaying the information about the period-registered location will be described by referring to FIG. 6.

In step S11, it is determined whether the period-registered location is within a 500-meter radius of the present position. If the period-registered location is not within a 500-meter radius of the present position, the operation of the flowchart continues to loop through step S11. Once the period-registered location is within a 500-meter radius of the present position, operation continues to step S12.

In step S12, it is determined whether the date indicated by the present date and time 31 comes within a time period of the schedule. If the present date and time 31 comes within the time period of the schedule, operation of the flowchart continues to step S13. If the date does not come within the period of the schedule, the operation terminates.

Next, in step S13, the fact that the present date and time 31 comes within the time period of the schedule is displayed on the display device. Operation of the flowchart continues to step S14.

In step S14, it is determined whether the operator wishes to visit the period-registered location. If the operator wishes to visit the period-registered location, operation of the flowchart continues to step S15. If the operator does not wish to visit the period-registered location, the operation is terminated.

Finally in step S15, a route search is begun and route guidance is provided.

Thus, according to the first embodiment, the operator inputs his or her schedule, such as a work, study, hobbies, sports, dining, sightseeing, shopping, and so on in a manner that a specific site point, a destination point, or a facility point is associated with a specific period of time. Thereby, the point can be displayed as a period-registered location onto the map 41 when the point is within the specified range with reference to the present position. Additionally, the period of the schedule relating to the period-registered location may be displayed onto the calendar 34.

The calendar 34 tells the operator that he or she is scheduled to visit the period-registered location shown on the map 41 within the time period of the schedule displayed on the calendar 34. Thereby, even if the operator registers a rough schedule that has a certain range in date, the operator can be reminded of that rough schedule whenever he or she comes within the specified range of the period-registered location during the time period of the registered rough schedule. This helps the operator to keep track of his or her oncoming rough schedules.

Furthermore, according to the first embodiment, the personal information (schedule) having already been input or registered may be edited by carrying out the same operations as performed in inputting new personal information. That is, there is no need to invoke a schedule-edit view or a memo-edit view. Further, when the personal information is edited and an attribute of the personal information is changed, the system automatically allocates the edited personal information to the file corresponding thereto. Thus, the operator can easily edit personal information that has already been registered.

Additionally, according to the first embodiment, when the operator designates a date, a route to the period-registered location may be searched and displayed. The predicted traffic information or the predicted meteorological information as to the area around such period-registered location on a date of the registered schedule can also be displayed. Therefore, upon the designation of the date, the traffic information or the meterological information as to the area around the registered location on the date of the schedule may be displayed onto the display device. Thereby, the operator can refer to the traffic information and the meteorological information and confirm or change his or her schedule.

Furthermore, according to the first embodiment, both the calendar 34 and the map 41 displayed in the information terminal 12b may use the schedule i.e., personal information that is inputted from the information terminal 12a. This means that the schedule having already been inputted from the information terminal 12a (e.g., a personal computer, an electronic personal organizer, or a portable telephone) may be directly used as well as displayed onto both of the calendar 34 and the map 41 in the information terminal 12b (e.g., a navigation apparatus). That is, the date or the destination of the schedule can be inputted without using information terminal 12b (e.g., the navigation apparatus).

Hereinafter, a second embodiment according to the invention will be describe referring to the following figures. For convenience of explanation, the same compositions and operations according to the first embodiment are not described.

Figure 7:
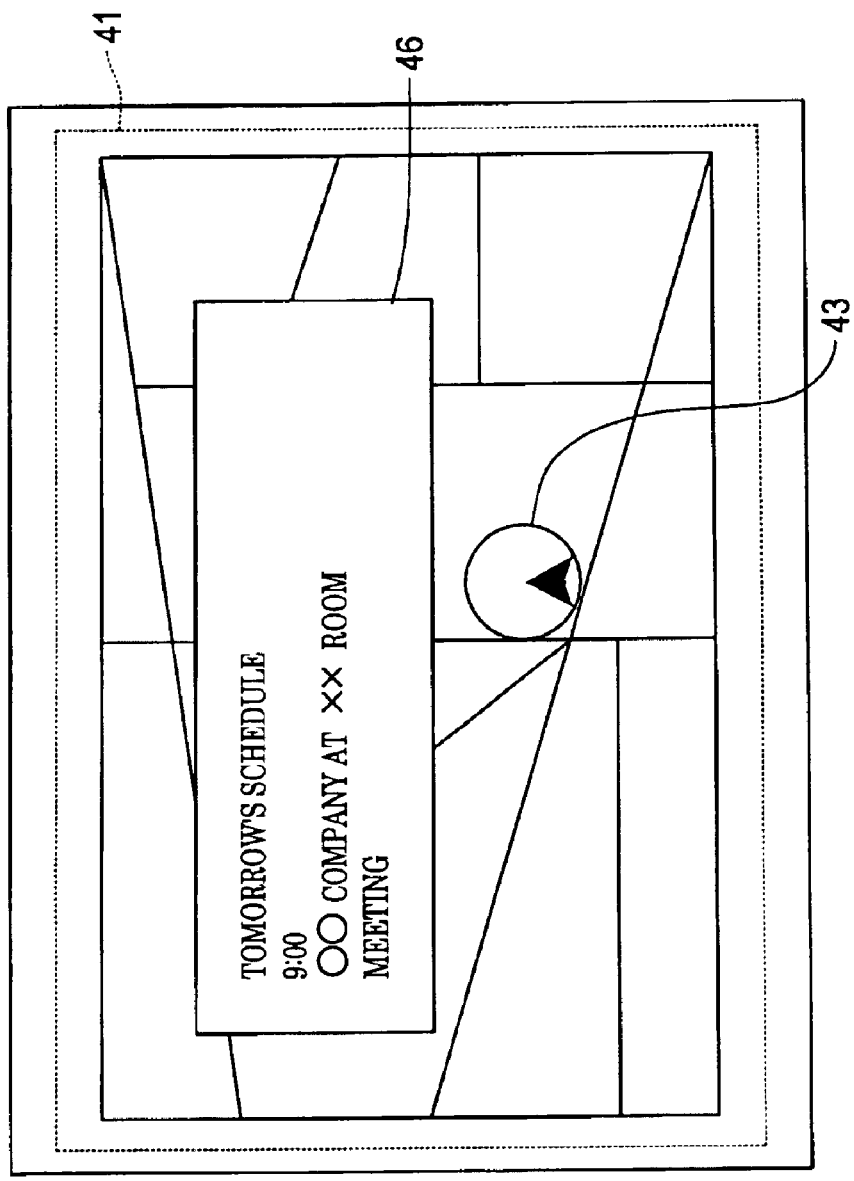
FIG. 7 shows a first exemplary screen view displayed on the information terminal according to a second embodiment of the invention.

FIG. 7 shows a first exemplary screen view displayed on the information terminal according to a second embodiment of the invention. FIG. 8 shows a second exemplary screen view displayed on the information terminal according to the second embodiment of the invention. FIG. 9 shows a third exemplary screen view displayed on the information terminal according to the second embodiment of the invention.

Here, the description takes a case where the system reminds the operator of the schedule before the date of that schedule comes.

First, the operator operates the information terminal 12a to input his or her personal information, for example, a schedule for a next month. Here, the schedule may relate to example, work, study, hobbies, a drive, a trip, recreations, sports, dining, or sightseeing. The schedule is made so that a specific site, a destination, a location of a facility, or an operator's activity done at the destination is associated with a date of the schedule.

Then, the operator sets the system so as to be reminded of the inputted schedule before the date of the schedule comes. In this regard, the operator can preset the timing of the reminder. In the second embodiment, the reminder is given to the operator whenever he or she turns on the information terminal 12b before the date of the schedule.

When the operator turns on the information terminal 12b, the map panel 40 the display device by means of the display control unit in the information terminal 12b, as shown in FIG. 7. If the information terminal 12b is an on-board navigation apparatus for a vehicle, the information terminal 12b is automatically turned on when the vehicle engine is started. When the navigation apparatus is turned on, a schedule reminder message 46 appears on the map 41 that depicts the area around the present position. The schedule reminder message 46 includes a summary of the schedule having already been input.

When the cursor 37 is clicked on the schedule reminder message 46, the display control device in information terminal 12b allows the schedule screen 50 that details the schedule reminder message 46 to appear onto the display device as shown in FIG. 8. The screen 50 has the reminder-timing box 51. In the present second embodiment, this box 51 tells the timing to remind the operator of his/her schedule. The operator can confirm the details of own schedule on the screen 50.

It is desirable that the reminder timing be defined by the operator. The reminder timing can be set on a daily basis, for example, "Remind me of a schedule one day or two days before the date of that schedule." Alternatively, the reminder timing may be set on a more specific time interval, for example, "Remind me of a schedule on the evening of the day before the date of that schedule," "Remind me of a schedule during 18:00–22:00 of the day before the date of that schedule," or "Reminded me of a schedule on the morning of the date of the schedule." This time interval may be defined, for example, as shown in FIG. 9.

Furthermore, if the information terminal 12b is a navigation apparatus or a portable telephone that includes a present position detective device, the reminder timing may be set as follows: "Remind me of a schedule when I am on my way home on one day before the date of that schedule" or "Remind me of a schedule when I am on my way to my office on the date of the schedule." Assume, for example, that the operator sets the reminder timing as follows: "Remind me of a schedule when I am on my way home on one day before the date of the schedule." In such case, on the day before the date of the schedule, the operator is reminded of the registered schedule on his or her way home when the information terminal 12b enters the specified area at a certain distance from his or her home (for example, the area within a 500-meter radius of his or her home). Still further, assume the operator sets the reminder timing as follows: "Remind me of a schedule when I am on my way to my office on the date of that schedule." In such case, on the very date of the schedule the operator is reminded of the schedule on his or her way to the office when the information terminal 12b enters the specified area at a certain distance from his or her office (for example, the area within a 500-meter radius of his or her office). In other circumstances, the reminder timing may be based exclusively on a location and not on the date of the schedule nor a time interval. For example, a railway station near the operator's home, an operator's favorite department store, or a park can be a trigger for the reminder. Once a location is specified, the system may remind the operator of today's schedule or tomorrow's schedule whenever the information terminal 12b enters an area defined by a certain distance from the specified location.

According to the second embodiment, the schedule reminder message may be given to the operator visually on the display device, or may be given audibly through voices, music, or chimes. For example, take a case where the system is set so that the operator can be reminded of the schedule when he or she is on his or her way home on the evening of one day before the scheduled date. In such case, the operator may be reminded of the schedule such as "Meeting from A.M. XX:XX at XX company tomorrow" with a human voice as if the operator had a secretary. It is preferable that the system be designed to allow the operator to select from at least a male voice or a female voice. Further, it is desirable that the system be designed to allow the operator to set a voice of someone in his or her family, a voice of a friend, a voice of his or her favorite actor or actress, or a voice of his or her favorite singer.

Advantageously, the schedule reminder message may be automatically switched between the visual reminder and the acoustic reminder according to the time interval. If the time intervals are set as shown in FIG. 9, the operator may be reminded of the today's schedule audibly early in the morning while reminded of the tomorrow's schedule visually. In the morning and daytime, the operator is reminded of the today's schedule audibly or visually while reminded of the tomorrow's schedule visually; in the evening and at midnight, the operator may be reminded of both the today's schedule and the tomorrow's schedule visually.

Further, the schedule reminder message may be externally transmitted from outside the information terminal 12*a*. For example, assume where the information terminal 12*a* is, for example, a portable telephone, a pocket telephone for PHS (Personal Handy Phone system), a mobile information terminal, or a personal digital assistant, each of which is always carried by the operator. Otherwise, assume the information terminal 12*a* is a home-use or office-use personal computer in all-day-long service. In such cases, the operator may be reminded of the schedule via a display device or a speaker, each of which may be included in the information terminal 12*a*.

Furthermore, the schedule may be someone else's schedule being externally transmitted from another person. The other person's schedule, transmitted from outside, may be registered and notified to the user before the date of the other person's schedule comes. In this case, the names of the other people must have been preliminarily registered in the information display system and accordingly ID numbers must be respectively issued to them. Generally, such other people may be friends, acquaintances, or family members of the operator. Usually, it is preferable that the other people are registered in the operator's personal file in the PIM database 21. Further, it is desirable that the other people are registered in the name of "Friend" as a sender or recipient on the other end of the communication. However, this "Friend" registration is optional.

Hereinafter, the "Friend" registration will be described in detail. First, someone on the other end of the communication sends his or her own schedule to the operator from his or her information terminal 12*a*, 12*b* to the information source server 11 via the network 27. Here, suppose that the schedule includes a date and time as well as a location for, for example, a business meeting, a banquet, a party, a date, or an appointment. If such schedule is transmitted with a name of sender to be shown in the sender name box, the system recognizes the transmitted schedule as "Friend Link" and stores it into a friend link file. Here, "Friend Link" means personal information (schedule) transmitted to the operator from another person. The friend link file is contained in the PIM database 21 in a manner that each friend link file is associated with each personal file. In this manner, the operator can confirm not only their own schedule but also a schedule transmitted from someone else, e.g., friends, acquaintances, or family members. If the other person's schedule includes the business meeting, the banquet, the party, the date, or the appointment with which the operator is involved, such schedule may be copied into the operator's personal file.

That is, the other person's schedule can be stored as the operator's schedule into the personal file. Thereby, the operator may be reminded of the other person's schedule before the date of that other person's schedule comes. For his or her own schedule, the operator may copy and use the other person's schedule in its entirety. Thereby, the operator can save himself or herself the work of independently inputting the schedule.

As understood from the second embodiment according to the invention, the preliminarily registration of the schedule makes audible or visual schedule reminders possible in advance, and thereby the operator may be reminded of the registered schedule before the date of the schedule comes.

According to the second embodiment, the timing of the schedule reminder is determined by the operator. For the confirmation of the schedule in advance, the operator may set the reminder timing according to his or her most convenient conditions. Further advantageously, the reminder message style may be selectable from either a visual type or an audible type. This allows the operator to be reminded of the schedule the most desirable way.

Thus, according to the second embodiment, the operator can always keep track of the registered upcoming schedules.

As many different embodiments of the invention may be made without departing from the spirit and scope thereof, it is to be understood that the present invention is not limited to the previously-described embodiments.

It should be appreciated that each list contained in the detailed description of preferred embodiments is non-exclusive and is intended to encompass any now known or later developed members of the class represented by that list.

Furthermore, while the present disclosure describes preferred embodiments for use to use in Japan, it will be readily apparent to one having ordinary skill in the art that the invention is easily adaptable for use in other countries.

What is claimed is:

1. An information display system, comprising:
  a first memory that stores map information;
  an input device that inputs a schedule, the schedule comprising a schedule location and a schedule time;
  a second memory that stores the schedule;
  a present position detector that detects the present position of a vehicle; and
  a controller that:
    determines whether the present position of the vehicle is within a predetermined distance of the schedule location;
    determines whether a present time is within a predetermined time period of the schedule time;
    allows, when the present position of the vehicle is within a predetermined distance of the schedule location and the present time is within a predetermined time period of the schedule time, an operator to determine whether to visit the schedule location;
    searches, when the operator determines to visit the schedule destination, for a route to the schedule location using the stored map information; and
    provides route guidance based on the searched route.

2. The information display system according to claim 1, further comprising:
  a display, wherein the controller displays traffic information on a map on the display.

3. The information display system according to claim 1, further comprising:
  a display, wherein the controller displays meteorological information on a map on the display.

4. The information display system according to claim 1, wherein the controller communicates a reminder message that reminds the user of the schedule visually.

5. The information display system according to claim 1, wherein the controller communicates a reminder message that reminds the user of the schedule audibly.

6. The information display system according to claim 1, further comprising:

an information receiver, wherein the schedule is transmitted to the information receiver from outside the information display system.

7. A method for displaying information, comprising:

storing map information;

inputting a schedule, the schedule comprising a schedule location and a schedule time;

storing the schedule;

detecting the present position of a vehicle;

determining whether the present position of the vehicle is within a predetermined distance of the schedule location;

determining whether a present time is within a predetermined time period of the schedule time;

allowing, when the present position of the vehicle is within a predetermined distance of the schedule location and the present time is within a predetermined time period of the schedule time, an operator to determine whether to visit the schedule location;

searching, when the operator determines to visit the schedule destination, for a route to the schedule location using the stored map information; and providing route guidance based on the searched route.

8. The method for displaying information according to claim 7, further comprising displaying a schedule reminder at a reminder time, the reminder time occurring a predetermined time period before the schedule time.

9. The method for displaying information according to claim 7, further comprising displaying a schedule reminder at a reminder time, the reminder time occurring whenever the display device is within a predetermined distance of the schedule location within the predetermined time interval before the scheduled time.

10. The method for displaying information according to claim 7, further comprising:

displaying traffic information.

11. The method for displaying information according to claim 7, further comprising:

displaying meteorological information.

12. The method for displaying information according to claim 7, further comprising visually communicating a schedule reminder message.

13. The method for displaying information according to claim 7, further comprising audibly communicating a schedule reminder message.

14. The method for displaying information according to claim 7, further comprising:

transmitting the schedule.

15. The method for displaying a schedule according to claim 7, further comprising:

receiving a transmitted schedule.

16. A storage medium storing a set of program instructions executable on a data processing device and usable to display information, the instructions comprising:

instructions for storing map information;

instructions for inputting a schedule, the schedule comprising a schedule location and a schedule time;

instructions for storing the schedule;

instructions for detecting the present position of a vehicle;

instructions for determining whether the present position of the vehicle is within a predetermined distance of the schedule location;

instructions for determining whether a present time is within a predetermined time period of the schedule time;

instructions for allowing, when the present position of the vehicle is within a predetermined distance of the schedule location and the present time is within a predetermined time period of the schedule time, an operator to determine whether to visit the schedule location;

instructions for searching, when the operator determines to visit the schedule destination, for a route to the schedule location using the stored map information; and instructions for providing route guidance based on the searched route.

* * * * *